United States Patent Office 3,547,699
Patented Dec. 15, 1970

3,547,699
FUEL CELL WITH AQUEOUS ETHYLENE DIAMINE ELECTROLYTE SOLUTION
Jean-Claude Charbonnier, Veuilly-la-Poterie, and Bernard Goue, Gif-sur-Yvette, France, assignors to Compagnie Generale d'Electricite, Paris, France, a corporation of France
Filed June 10, 1968, Ser. No. 735,895
Claims priority, application France, June 9, 1967, 109,890
Int. Cl. H01m 27/00
U.S. Cl. 136—86                6 Claims

ABSTRACT OF THE DISCLOSURE

An electrolyte for fuel cells which essentially comprises an aqueous ethylene diamine solution. Soluble compounds may be added to improve the conductivity of the electrolytic ethylene diamine solution. Exemplary soluble compounds are potassium or sodium salts. Preferred concentrations of the aqueous ethylene diamine solution range from about 15 grams to about 40 grams of ethylene per liter. The electrolyte finds particular application for use in a cell wherein the fuel contains carbon dioxide or wherein the fuel cell is capable of yielding carbon dioxide by reaction at the electrodes.

BACKGROUND OF THE INVENTION

Field of the invention

The present invention relates to an electrolyte for fuel cells, and, more particularly, for cells in which the fuel contains carbon dioxide or is capable of giving carbon dioxide by reaction with the electrodes, for example a hydrocarbon cell.

Description of the prior art

Electrolytes consisting of at least one alkanolamine or one alkanolamine derivative have been used in fuel cells wherein the fuel contains carbon dioxide. However, such electrolytes have the disadvantage of having a very low pH value, which will result in a very low electrical conductivity. For example, a normal aqueous diethanolamine solution has a pH value of 11, and a conductivity of 0.75 $10^{-3} \Omega^{-1}$ cm.$^{-1}$.

It is extremely difficult to increase the conductivity of the alkanolamine-type electrolytes by adding compounds such as potassium or sodium salts since solubility of these substances in the alkanolamine-type electrolytes is very low.

SUMMARY OF THE INVENTION

It has been found that an aqueous ethylene diamine solution forms an excellent electrolyte for use in fuel cells, particularly for cells in which the fuel contains carbon dioxide or is capable of giving carbon dioxide by reaction with the electrodes, such, a hydrocarbon cell.

The aqueous ethylene diamine solution preferably comprises from about 15 grams to about 40 grams of ethylene diamine per liter.

The conductivity of the electrolytic ethylene diamine solution may be improved by the addition of soluble compounds, such as potassium or sodium salts, with both the carbonate and the oxalate salts being exemplary of the many compounds which are acceptable.

When an aqueous ethylene diamine solution is utilized in combination with a potassium or sodium salt, the ethylene diamine solution may advantageously be between about 60 and about 100 grams per liter.

Thus, the electrolyte of the present invention meets the objects of providing an electrolyte having a high pH value, providing an electrolyte in which common salts are soluble and which may, due to this solubility, illustrate enhanced conductivity and providing an electrolyte which shows enhanced capability in a hydrocarbon-type fuel cell.

DESCRIPTION OF THE PREFERRED EMBODIMENTS

The aqueous ethylenediamine solution preferably comprises from about 15 grams to about 40 grams of ethylenediamine per liter.

In the case of a normal diethanolamine solution, the conductivity is 0.75 $10^{-3} \Omega^{-1}$ cm.$^{-1}$, while in the case of a normal ethylenediamine solution the conductivity is 1.4 $10^{-3} \Omega^{-1}$ cm.$^{-1}$.

In addition, the conductivity of the electrolytic ethylenediamine solution may also be improved by the addition of a soluble compound such as, for example, a potassium or sodium salt. However, these compounds are to be taken as merely illustrative of the many compounds which will increase the conductivity of an electrolytic solution, it being believed that the general theory and properties involved are well known to those skilled in the art.

The features and other advantages of the present invention will now be described with reference to a number of specific examples of electrolyte compositions produced in accordance with the present invention.

As illustrative of a few of the electrolytes which may be produced in accordance with the invention, there may be given:
A pure aqueous ethylenediamine solution.
An aqueous ethylenediamine solution comprising, in addition, a soluble potassium or sodium salt, such as, for example, an oxalate or a carbonate.

In the case of a pure aqueous ethylenediamine solution, the solution preferably comprises from about 15 grams to about 40 grams of ethylenediamine per liter. It has been found that a concentration of preferably 30 grams per liter, which corresponds to a 2 N solution, will often give the most optimum results.

Thus, the present invention provides an electrolyte for fuel cells, more particularly for cells in which the fuel contains carbon dioxide or is capable of giving carbon dioxide reaction with the electrodes, for example, in a hydrocarbon cell, which comprises an aqueous ethylene diamine solution as the main active ingredient.

The electrical conductivity of such a solution is substantially equal to 1.7 $10^{-3} \Omega^{-1}$ cm.$^{-1}$.

When the electrolyte comprising an aqueous ethylenediamine solution containing a potassium or sodium salt, the ethylenediamine concentration is advantageously between about 60 and about 100 grams per liter.

When the added salt is potassium oxalate, the electrolytic solution advantageously comprises 90 grams per liter of ethylenediamine, and 80 grams per liter of potassium oxalate. The pH value of the solution thus obtained will be equal to 13.2.

Other advantages afforded by the use of the electrolytes according to the invention will be apparent upon reference to the drawings.

Figure 1:
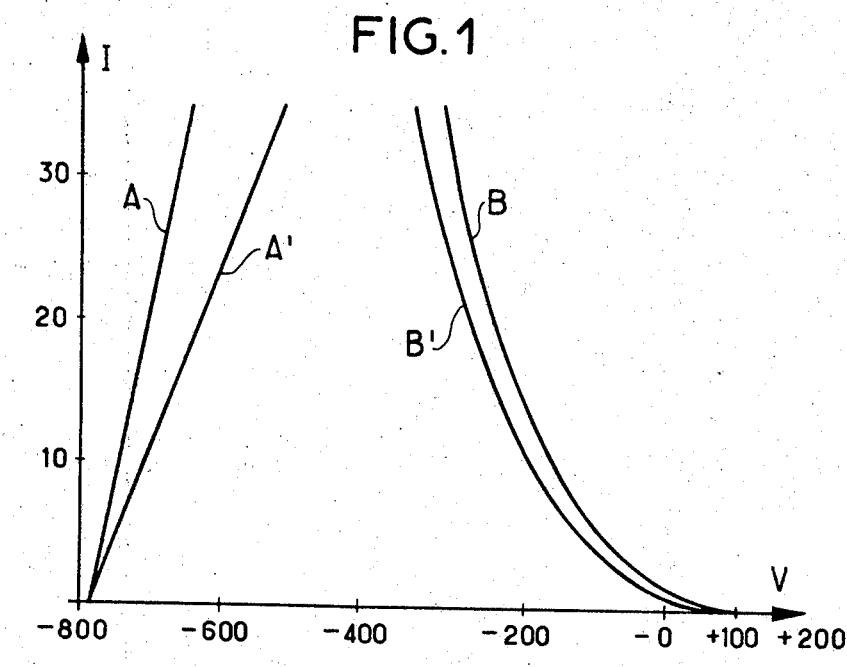
FIG. 1, which is a plot of voltage, in millivolts, vs. current, in milliamperes, illustrate the polarization curve of the fuel electrode and the oxygen electrode of a fuel cell when using a diethanol amine electrolyte and an electrolyte produced in accordance with the present invention.

FIG. 1 gives the polarization curves of the platinum electrodes of a fuel cell in which:

The fuel gas is formed of hydrogen containing carbon dioxide in a mole concentration of $CO_2$ of 25% of the pressure of the fuel gas being two bars absolute.

The combustion-assisting gas is pure oxygen, under a pressure of two bars absolute.

The polarization curves of the electrodes are given as a function of the potential difference existing between each platinum electrode and an Hg/HgO electrode chosen to define a reference voltage.

The curves A and B represent, respectively, values of the current I, in milliamperes, as a function of the voltage, in millivolts, at the fuel electrode, and the combustion assisting electrode, when the electrolyte consists of a 6 N aqueous ethylenediamine solution containing 80 grams per liter of potassium oxalate.

The curves A' and B' represent, respectively, values of the current I, in milliamperes, as a function of the voltage, in millivolts, at the fuel electrode, and at the combustion-assisting electrode, when the electrolyte consists of an aqueous 4 N diethanolamine solution containing 80 grams per liter of potassium oxalate.

In both cases, the electrolytic solutions were brought to a temperature in the neighborhood of 90° C.

Figure 2:
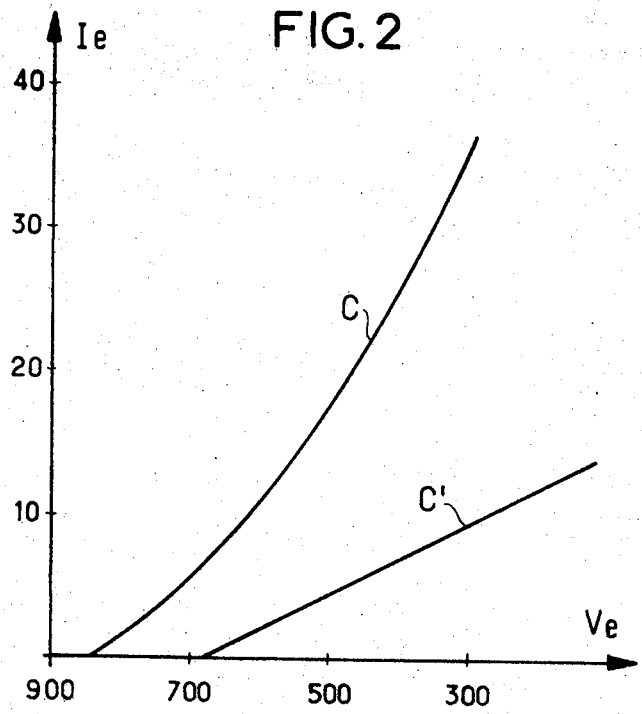
FIG. 2, which is to be read in conjunction with FIG. 1, illustrates the variation in the current, in milliamperes, as a function of the voltage, in millivolts, across the terminals of a cell.

In FIG. 2 the curves represent the variation of the current I, in milliamperes, as a function of the voltage V, in millivolts, across the terminals of the cell, corresponding to the curves of FIG. 1, i.e., curve C relates to the ethylenediamine solution, and curve C' relates to the diethanolamine solution.

The curves plotted in FIGS. 1 and 2 clearly show the advantage in employing ethylenediamine instead of an alkanolamine, i.e., it can be seen that for a corresponding voltage value, the current is higher for the electrolyte of the present invention.

What is claimed is:
1. A fuel cell comprising an electrolyte and two electrodes and where the fuel contains carbon dioxide or is capable of evolving carbon dioxide by consumption, the improvement wherein the electrolyte comprises an aqueous ethylene diamine solution.

2. A fuel cell as in claim 1 wherein said ethylene diamine solution contains from about 15 to about 40 grams of ethylene diamine per liter.

3. A fuel cell as in claim 1 wherein said ethylene diamine solution contains an added soluble compound to increase the conductivity thereof.

4. A fuel cell as in claim 3 wherein said soluble compound is a member selected from the group consisting of potassium and sodium salts.

5. A fuel cell as in claim 4 wherein said ethylene diamine solution contains from about 60 to about 100 grams of ethylene diamine per liter.

6. A fuel cell as in claim 4 wherein said soluble compound is selected from the group consisting of potassium oxalate and potassium carbonate.

References Cited
UNITED STATES PATENTS

| | | | |
|---|---|---|---|
| 2,950,999 | 8/1960 | Craig et al. | 136—155 |
| 3,083,251 | 3/1963 | Moos | 136—86 |
| 3,415,688 | 12/1968 | Foucry | 136—155X |

OTHER REFERENCES

Palii et al.: Noncyanide electrolytes for copper and cadmium plating, Chemical Abstracts, vol. 65, 1966, p. 3336(b).

DONALD L. WALTON, Primary Examiner

U.S. Cl. X.R.

136—154